Figure 3:
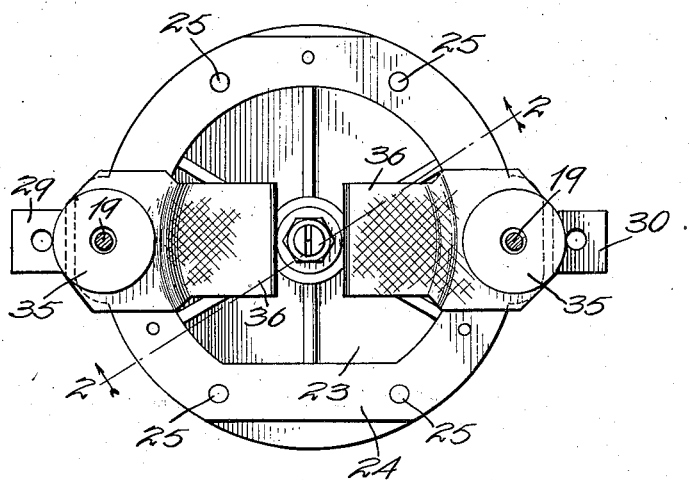

J. H. HODDE.
METHOD OF AND APPARATUS FOR VARYING THE SPEED OF ELECTRIC METERS ON REVERSAL OF CURRENT FLOW.
APPLICATION FILED NOV. 1, 1912.
1,190,291.
Patented July 11, 1916.
3 SHEETS—SHEET 1.
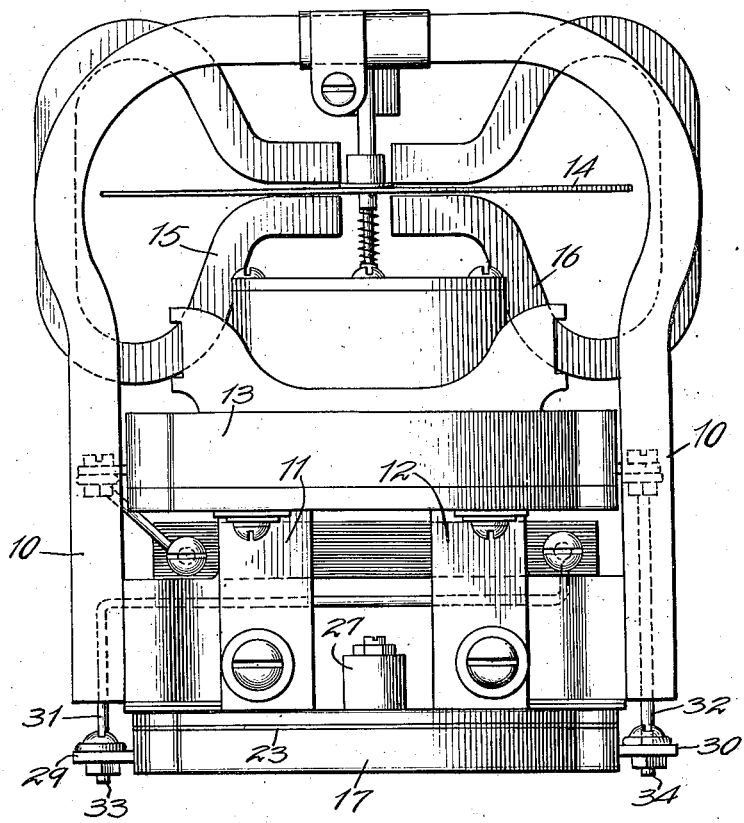
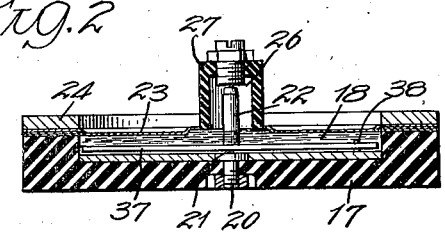

J. H. HODDE.
METHOD OF AND APPARATUS FOR VARYING THE SPEED OF ELECTRIC METERS ON REVERSAL OF CURRENT FLOW.
APPLICATION FILED NOV. 1, 1912.

1,190,291.

Patented July 11, 1916.
3 SHEETS—SHEET 2.

J. H. HODDE.
METHOD OF AND APPARATUS FOR VARYING THE SPEED OF ELECTRIC METERS ON REVERSAL OF CURRENT FLOW.
APPLICATION FILED NOV. 1, 1912.

1,190,291.

Patented July 11, 1916.
3 SHEETS—SHEET 3.

UNITED STATES PATENT OFFICE.

JACOB H. HODDE, OF SPRINGFIELD, ILLINOIS, ASSIGNOR TO SANGAMO ELECTRIC COMPANY, OF SPRINGFIELD, ILLINOIS, A CORPORATION OF ILLINOIS.

METHOD OF AND APPARATUS FOR VARYING THE SPEED OF ELECTRIC METERS ON REVERSAL OF CURRENT-FLOW.

1,190,291.

Specification of Letters Patent. Patented July 11, 1916.

Application filed November 1, 1912. Serial No. 729,010.

*To all whom it may concern:*

Be it known that I, JACOB H. HODDE, a citizen of the United States, residing at Springfield, in the county of Sangamon, State of Illinois, have invented certain new and useful Improvements in Methods of and Apparatus for Varying the Speed of Electric Meters on Reversal of Current-Flow, of which the following is a specification, reference being had to the accompanying drawings.

My invention has principally to do with the operation of electric meters, and has for its primary object to provide for regulating the operation of ampere-hour meters on charge and on discharge of a storage battery so that the meter may be caused to operate faster with the current flowing in one direction than it does with the current flowing in the opposite direction. For example, in meters used in connection with storage batteries, it is desirable that the meter run slower on charge than on discharge in order to obtain the desired overcharge. The advantages of such arrangement are set forth in patent to Robert C. Lanphier for shunt for electric meters, No. 958,508, dated May 17, 1910, and therefore need not be detailed here.

The special purpose of my present invention is to control the rate of operation of the meter by utilizing the direction of flow of the current to actuate suitable resistance mechanism associated with the meter, to increase or reduce the resistance, and thereby appropriately vary the effective current flowing through the meter. In this way I provide for the application of ampere-hour meters with batteries in classes of service where differential shunt meters cannot be used, as for example, in connection with train lighting axle equipment where the generator is driven from the train axle and the battery floats across the generator line, so that it is charged when the train is above a certain speed and is discharged on carrying the load when the train is stopped or is below the critical speed. My invention also has a wide field in connection with private lighting plant work where the battery is operated with a generator, much the same as in train lighting, as well as in many other situations where it is desirable to have the meter operate at a different rate on charge than on discharge. So far as the resistance mechanism proper is concerned, it may also be applied in any situation to which it is adapted.

To these ends, my invention, considered generically and apart from its application to a meter of the type described consists in varying the resistance of an electrical conductor composed of two elements of different conductivity which coöperate to provide a path for the current, by moving one of said elements so as to vary the extent to which it is interposed in the path of the current flowing through the conductor, and thereby increasing the proportionate share of the other element as the conducting medium for the current flowing through the conductor as a whole.

More specifically, it consists in providing a conductor composed of a body of mercury and a non-circular conducting element of different conductivity arranged therein so that they coöperate to constitute the conductor as a wohle and varying the resistance of the conductor by moving said non-circular element so as to vary the proportionate part thereof which lies in the path of the current flowing through the conductor.

In its application to electricity meters or analogous devices, my improved method contemplates the moving of the movable element by its reaction with a magnetic field acting thereon so that the movement of such element may be controlled by the direction of flow of current through the conductor.

This method may be carried out by means of various forms of apparatus, one of which, and the preferable form, is illustrated in the drawings and is more fully hereinafter described.

Figure 4:
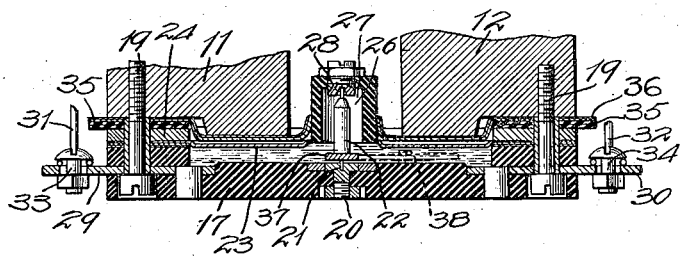
Figure 5:
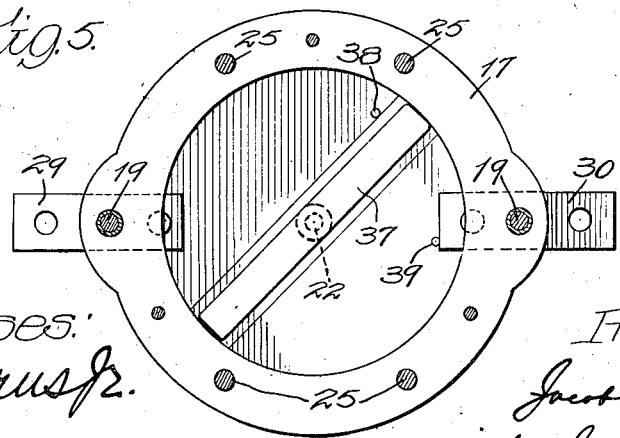

In the accompanying drawings,—Figure 1 is an elevation illustrating an ampere-hour meter equipped with my present improvement, the recording train and housing of the meter being removed, as they are not necessary to the illustration of the invention; Fig. 2 is a sectional view of what I shall term the variable resistor apparatus, by which the desired variation of the resistance is secured, said view being taken on line 2—2 of Fig. 3; Fig. 3 is a plan view of the variable resistor, showing also the insulating devices; Fig. 4 is a central transverse vertical section of the lower portion of the meter showing the lower ends of the permanent magnets with the variable resistor attached thereto; Fig. 5 is a plan view of the variable resistor, the cover plate being removed; and Figs. 6, 7, 8 and 9 are diagrammatic views showing various arrangements for connecting up the resistor with the meter.

Referring to the drawings,—10 indicates the permanent magnet of a mercury motor meter of the type shown in the said Lanphier Patent No. 958,508. 11—12 indicate the pole pieces thereof. 13 indicates the housing of the usual armature which is immersed in the mercury contained in said housing, and 14 indicates the usual damping disk operating between permanent magnets 15—16. These parts need no further description as their construction, arrangement and operation are well understood.

17 indicates a suitable vessel or receptacle containing on its upper surface a mercury chamber 18, as shown in Fig. 2. Said receptacle is arranged to be secured to the lower ends of the pole pieces 11—12, of the permanent magnet 10, as shown in Fig. 4, being secured thereto by screws 19, or in any other suitable way. The receptacle 17 is made of any suitable non-conducting material and is provided centrally with a bearing 20, adapted to receive the lower pivot 21 of a spindle 22.

23 indicates a cover plate or disk of metal, or other suitable material, which fits upon the margins of the receptacle 17 and is held in place by an overlying ring-plate 24, which is secured by screws 25. The cover-plate 23 is provided centrally with a cylindrical extension 26, forming a chamber 27, as shown in Fig. 4, and carries an adjustable jewel bearing 28, in which the upper end of the spindle 22 is pivoted.

29—30 indicate electrical contact plates which are arranged at diametrically opposite points of the receptacle 17 and extend from the mercury chamber 18 and out beyond the receptacle so that electrical connection may be conveniently made therewith. In Fig. 4, I have shown connecting wires 31—32, connected to said plates by bolts 33—34.

It will be understood that the receptacle 17 is electrically insulated from the magnet pole pieces 11—12, and to this end I preferably employ mica disks 35, which are interposed between the ring-plate 24 and the pole pieces, and also strips of shellacked cloth 36, which extend between the mica disks and the pole pieces, and also between said pole pieces and the cover-plate 23.

37 indicates a bar of copper, or equivalent conducting material, which is carried by the spindle 22 near its lower end, so that it lies in the mercury chamber and may be turned by the rotation of said spindle so as to extend diametrically across the mercury chamber, between the contact-plates 29—30. Said bar may also be turned so as to occupy an angular position with reference to said contact plates, as illustrated in Fig. 5. For the purpose of limiting the extent of rotation of the spindle 22, I provide stops 38—39, so disposed as to limit the movement of the bar 37 to the desired arc. If desired, the stops 38 may be made adjustable, preferably as set forth in Letters Patent No. 1,177,702 granted to me April 4, 1916, so that the degree of movement of the bar 37 may be varied. The mercury chamber 18 is filled with mercury, so as to submerge the bar 37, as illustrated in Figs. 2 and 4.

It will be apparent that when the bar 37 is in line with the contact plates 29—30, inasmuch as such bar has greater conductivity than the mercury, a path of least resistance will be presented to the flow of current through the resistor; when, however, the bar swings out of such line, the resistance will be increased to an extent corresponding with the extent of movement of the bar, and would reach the maximum if the bar should occupy a position perpendicular to the line of the contact-plates 29—30. In the construction shown, the stop 38, of course, prevents the bar 37 from reaching the latter position, so that in the arrangement illustrated, the maximum resistance is obtained when the bar 37 is in contact with the stop 38. As the bar 37 is in the magnetic field of the permanent magnet 10, when an electric current flows in one direction through the mercury chamber 18, between the contact-plates 29—30, the bar 37 will be caused to rotate in one direction, while flow of the current in the opposite direction will effect a reverse movement of said bar, according to the principle governing the operation of mercury motor meters.

The manner in which the variable resistor may be connected up with the meter mechanism is shown in Figs. 6 to 9 inclusive.

Figure 6:
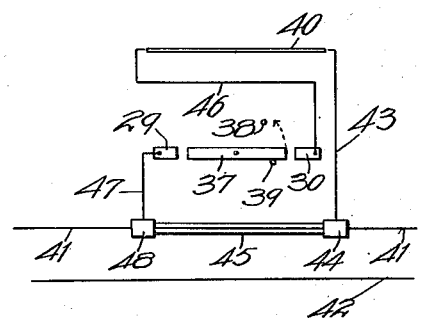

In the arrangement shown in Fig. 6, in which 40 indicates the armature of the meter, it will be noted that the resistor is in series with the armature, 41—42, indicating the load wires, 43 a wire leading from one terminal 44 of a shunt 45, to the mercury chamber of the meter, 46 a wire leading from the opposite side of the mercury chamber of the meter to the contact-plate 30 of the resistor, and 47 a wire leading from the contact-plate 29 of the resistor to the other terminal 48, of the shunt 45. Thus the current passes over wire 43 to the mercury chamber of the meter, through the armature 40 thereof, by wire 46 to contact-plate 30, thence through the mercury chamber of the resistor, through the resistor bar 37, and thence over wire 47. It will be noted that when the parts are in the position shown in Fig. 6, the minimum resistance is presented by the resistor, thereby permitting a maximum flow of current through the meter and causing the meter to run at maximum speed for a given load. When the direction of flow of the current is reversed, the bar 37 will be caused to automatically swing into contact with the pin 38, thereby increasing the resistance presented by the resistor, and accordingly reducing the flow of current through the meter so that it operates more slowly.

Figure 7:
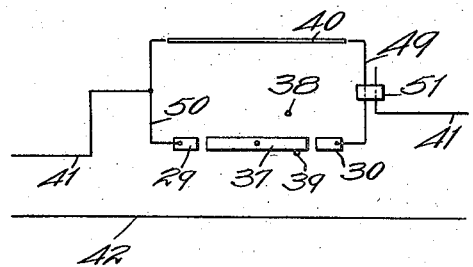

In Fig. 7 I have illustrated the resistor as connected in parallel with the meter. By this arrangement the contact-plate 30 is connected with one side of the mercury chamber of the meter by a connection 49, and the contact-plate 29 is connected with the opposite side of said mercury chamber by a connection 50. The connection 49 is connected with the load wire 41 by a sliding connection 51, by which the division of current between the meter and the resistor may be varied. This arrangement permits of getting a wider range of effect in small capacity meters than where the resistor is in series, as shown in Fig. 6.

Figure 9:
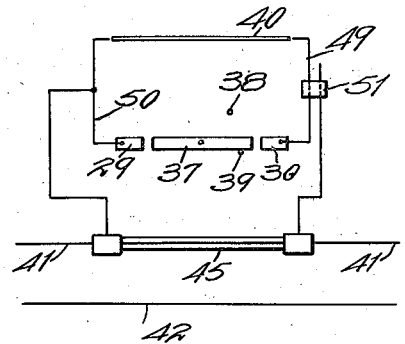

Fig. 9 illustrates an arrangement similar to that shown in Fig. 7, except that the shunt 45 is employed in connection with the parallel arrangement shown in Fig. 7. This arrangement is suitable for large capacity meters.

Figure 8:
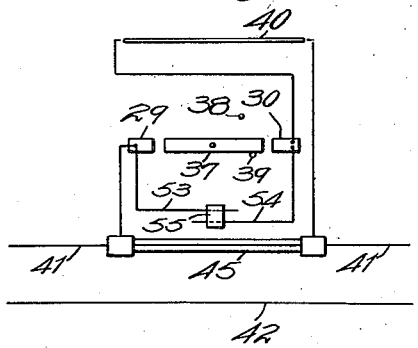

In Fig. 8 I have shown a modification of the arrangement shown in Fig. 6, in which an adjustable or variable resistance around the resistor is provided to permit of slightly varying the percentage of overcharge obtainable. This variable resistance comprises connections 53—54, connected respectively with the contact-plates 29—30, and connected by a sliding connection 55. By moving said slide in one direction or the other, the resistance around the resistor may be varied, with a consequent variation of the percentage of overcharge which may be obtained.

From the foregoing description, it will be clear that the action of the resistor is automatic and is controlled by the direction of flow of the current, so that a flow of current in one direction automatically increases the resistance provided by the resistor, and a flow of current in the opposite direction reduces such resistance. The action of the meter is consequently varied. It will be understood, of course, that the resistor may be employed either to cause the meter to operate faster on charging than on discharging, or the reverse, as desired.

While I have described with considerable particularity the form of apparatus illustrated in the drawings, my invention is generic in character and may be embodied in other forms of apparatus than that shown. The claims hereinafter made are, therefore, to be construed accordingly.

That which I claim as my invention and desire to secure by Letters Patent, is,—

1. The method of varying the speed of an electricity meter when actuated by current flowing in one direction as compared with its speed when actuated by an oppositely flowing current, which consists in interposing resistance in the path of the current, and subjecting such resistance to the influence of a magnetic field and thereby changing the current flowing through the meter by varying such resistance according to the direction of flow of the current therethrough.

2. The method of varying the speed of an electricity meter when actuated by current flowing in one direction as compared with its speed when actuated by an oppositely flowing current, which consists in interposing resistance in the path of the current, and subjecting such resistance to the influence of a magnetic field and thereby changing the proportion of total current flowing through the meter and a current path parallel therewith, by varying such resistance according to the direction of flow of the current therethrough.

3. The combination with an electricity meter, of a resistor comprising a body of mercury and a conducting element therein of different conductivity, said conducting element being movable in one direction or the other, depending upon the direction of flow of current therethrough, to vary the current flowing through the meter.

4. The combination with an electricity meter, of a resistor comprising a body of mercury and a rotary conducting element therein of different conductivity, said conducting element being movable in one direction or the other, depending upon the direction of flow of current therethrough, to vary the proportion of total current flowing through the meter and a path parallel therewith, according to the direction of flow of current through the meter.

5. The combination with a mercury motor meter having a magnet of constant polarity, of a resistor lying in the magnetic field of said magnet, comprising a body of mercury and a rotary conducting element therein of different conductivity, said conducting element being movable in one direction or the other, depending upon the direction of flow of current therethrough, to vary the current flowing through the meter.

6. The combination with a mercury motor meter, comprising an armature and a permanent magnet, of a resistor comprising a mercury receptacle, the mercury in said receptacle being connected with the meter circuit, a pivoted conducting member of different conductivity in said mercury adapted by its rotation to vary the resistance of the resistor, said conducting member lying within the magnetic field of said magnet, and means for limiting the extent of movement of said conducting member.

7. The combination with an electricity meter, of a resistor comprising a body of mercury and a conducting element therein of different conductivity, said resistor being connected in parallel with the meter, and said conducting element being movable in one direction or the other, depending upon the direction of flow of current therethrough, to vary the current flowing through the meter.

8. The combination with a mercury motor meter comprising an armature and a permanent magnet having pole pieces, of a resistor comprising a mercury receptacle secured to said pole pieces, the mercury in said receptacle being connected with the meter circuit, a pivoted conducting member in said mercury, said conducting member lying within the magnetic field of said magnet, and means for limiting the extent of movement of said conducting member.

9. A variable resistor, comprising a conductor composed of a plurality of conducting elements of different conductivity associated to jointly form a path for the current through the resistor, one of said elements being movable to vary the resistance of the resistor to the flow of current therethrough, means for limiting the movement of said movable element, and means for effecting the movement of said movable element in one direction or the other, depending upon the direction of flow of current through said conductor.

10. A variable resistor, comprising a conductor composed of a body of mercury and a conducting element therein of different conductivity, the latter element being movable to vary the resistance of the resistor to the flow of current therethrough, means for limiting the movement of said movable element, and means for effecting the movement of said movable element in one direction or the other, depending upon the direction of flow of current through said conductor.

11. A variable resistor, comprising a conductor, composed of a plurality of conducting elements of different conductivity adapted to lie in the path of the current, one of said elements being movable to vary the proportionate parts of said elements which are interposed in the path of the current, means for preventing the movement of said movable element beyond its position of maximum resistance, and means for causing said movable element to move in one direction or the other, depending upon the direction of flow of current through said conductor.

12. A variable resistor, comprising a conductor composed of a body of mercury and a conducting element of different conductivity, the latter element being movable to vary the resistance of the resistor to the flow of current therethrough, means for limiting the movement of said movable element, and a permanent magnet associated with said conductor for controlling the movement of said movable element.

13. A variable resistor, comprising a conductor composed of a body of mercury, and a conducting element therein of different conductivity, the latter element being movable to vary the proportionate parts of said elements which are interposed in the path of the current, means for preventing the movement of said movable element beyond its position of maximum resistance, and means for causing said movable element to move in one direction or the other, depending upon the direction of flow of current through said conductor.

14. A variable resistor, comprising a body of mercury, a pivotally-mounted non-circular conducting element of different conductivity therein, said elements being associated to jointly form a path for the current the resistance of which may be varied by the rotation of the pivoted element, means for limiting the range of movement of said pivoted element, and a permanent magnet associated with said conductor, said movable element being in the magnetic field of said magnet.

15. A variable resistor for electric meters, comprising a suitable receptacle adapted to contain mercury, a conducting member adapted to swing in the mercury in said receptacle to vary the resistance of the resistor, means for subjecting said conducting member to the influence of a magnetic field of constant polarity, contact devices at opposite sides of said conducting member, and means for limiting the movement of said conducting member.

JACOB H. HODDE.

Witnesses:
 ROBERT C. LANPHIER,
 SCOTT LYNN.